US00RE46197E

(19) United States
(12) Reissued Patent
Takahashi et al.

(10) Patent Number: US RE46,197 E
(45) Date of Reissued Patent: Nov. 8, 2016

(54) CUTTING INSERT

(75) Inventors: Hidebumi Takahashi, Ibaraki-ken (JP); Hiroshi Hoki, Ibaraki-ken (JP); Hiroaki Hayashizaki, Ibaraki-ken (JP)
(73) Assignee: Mitsubishi Materials Corporation, Tokyo (JP)

(21) Appl. No.: 29/404,265
(22) Filed: Oct. 18, 2011

Related U.S. Patent Documents

Reissue of:
(64) Patent No.: Des. 640,716
Issued: Jun. 28, 2011
Appl. No.: 29/294,338
Filed: Jan. 4, 2008

(30) Foreign Application Priority Data

Jul. 5, 2007 (JP) ..... 2007-018147
Dec. 5, 2007 (JP) ..... 2007-033430
Dec. 5, 2007 (JP) ..... 2007-033431
Dec. 5, 2007 (JP) ..... 2007-033432

(51) LOC (10) Cl. ..... 15-09
(52) U.S. Cl.
USPC ..... D15/139
(58) Field of Classification Search
USPC ..... D15/138, 139, 140; 407/33–52, 77, 407/107–120
See application file for complete search history.

(56) References Cited

U.S. PATENT DOCUMENTS 6,079,912 A * 6/2000 Rothballer ..... 407/114
D482,706 S * 11/2003 Svensson ..... D15/139

(Continued)

FOREIGN PATENT DOCUMENTS

JP D1321033 2/2008

*Primary Examiner* — Phillip S Hyder
(74) *Attorney, Agent, or Firm* — Leason Ellis LLP

(57) CLAIM

The ornamental design for a cutting insert, as shown and described.

DESCRIPTION

FIG. 1 is a perspective view of a first embodiment of the cutting insert.
FIG. 2 is a front elevation view thereof. A rear elevation view is identical with the front elevation view.
FIG. 3 is a top plan view thereof.
FIG. 4 is a bottom plan view thereof.
FIG. 5 is a right side elevation view thereof. A left side elevation view is identical with the right side elevation view.
FIG. 6 is a cross-sectional view thereof taken along line 6-6 in FIG. 2.
FIG. 7 is a cross-sectional view thereof taken along line 7-7 in FIG. 2.
FIG. 8 is a perspective view of a second embodiment of the cutting insert.
FIG. 9 is a front elevation view thereof. A rear elevation view is identical with the front elevation view.
FIG. 10 is a top plain view thereof.
FIG. 11 is a bottom plan view thereof.
FIG. 12 is a right side elevation view thereof. A left side elevation view is identical with the right side elevation view.
FIG. 13 is a cross-sectional view thereof taken along line 13-13 in FIG. 9.
FIG. 14 is a perspective view of a third embodiment of the cutting insert.
FIG. 15 is a front elevation view thereof. A rear elevation view is identical with the front elevation view.
FIG. 16 is a top plain view thereof.
FIG. 17 is a bottom plan view thereof.
FIG. 18 is a right side elevation view thereof. A left side elevation view is identical with the right side elevation view[; and,].
FIG. 19 is a cross-sectional view thereof taken along line 19-19 in FIG. 15.
*FIG. 20 is a perspective view of a fourth embodiment of the cutting insert showing our new design.*
*FIG. 21 is a front elevation view of the fourth embodiment. The rear elevation view is identical to the front elevation view.*
*FIG. 22 is a top plan view of the fourth embodiment.*
*FIG. 23 is a bottom plan view of the fourth embodiment.*
*FIG. 24 is a right side-elevation view of the fourth embodiment. The left side elevation view is identical to the right side elevation view; and,*
*FIG. 25 is a cross-sectional view of the fourth embodiment taken along line 25-25 in FIG. 21.*
*The broken lines in FIGS. 20 through 25 depict portions of the cutting insert in which the design is embodied that are not considered part of the claimed design.*

1 Claim, 25 Drawing Sheets

Figure 1:
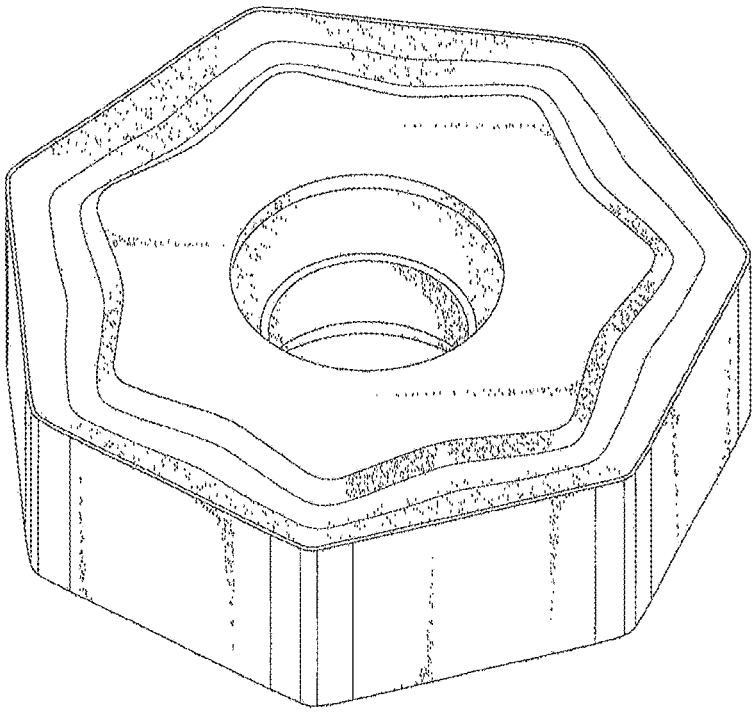
Figure 2:
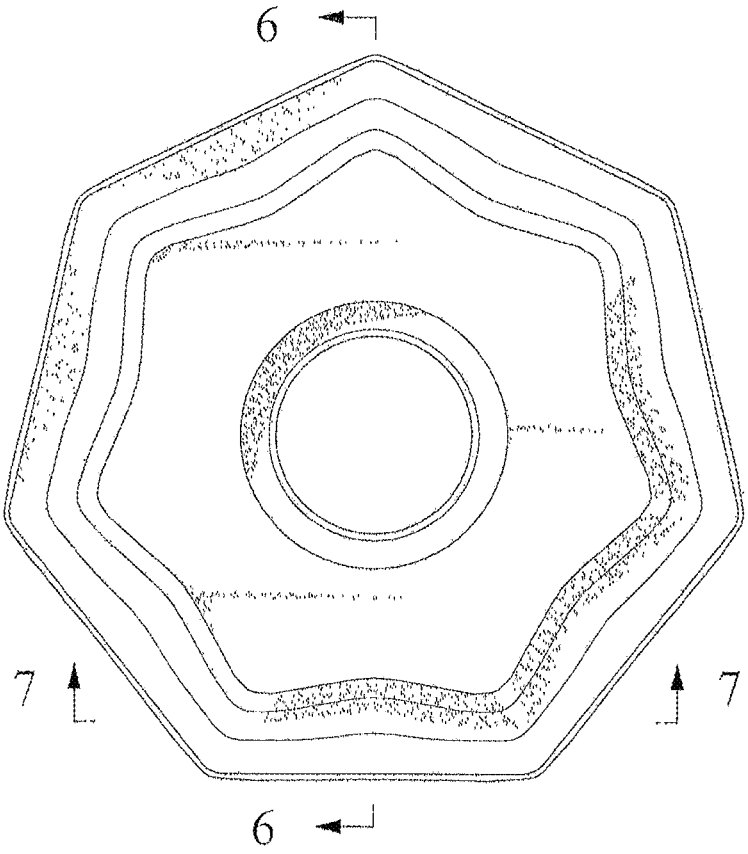
Figure 3:
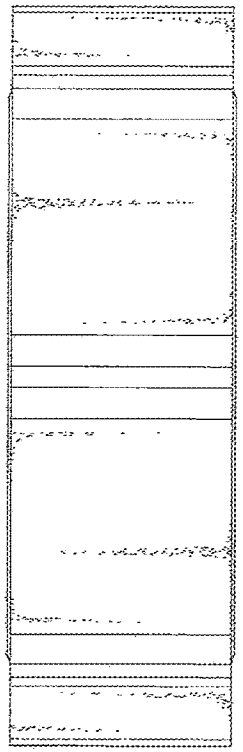
Figure 4:
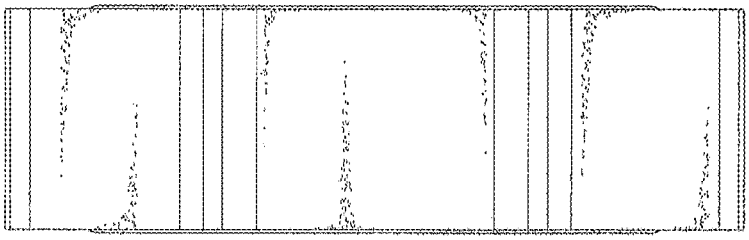
Figure 5:
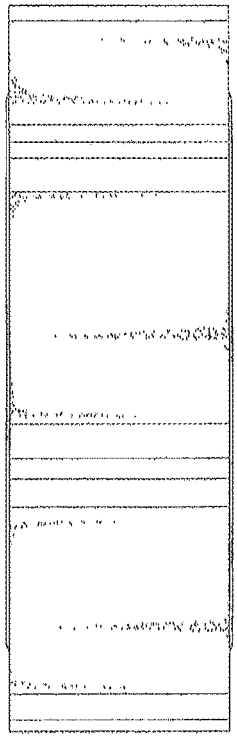
Figure 6:
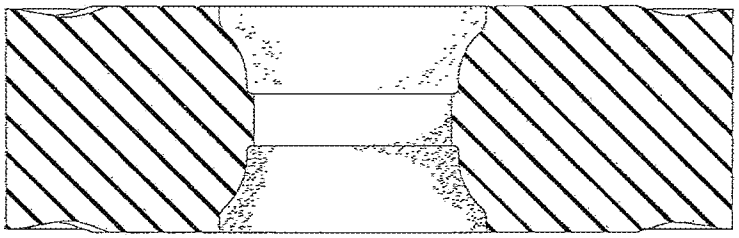
Figure 7:
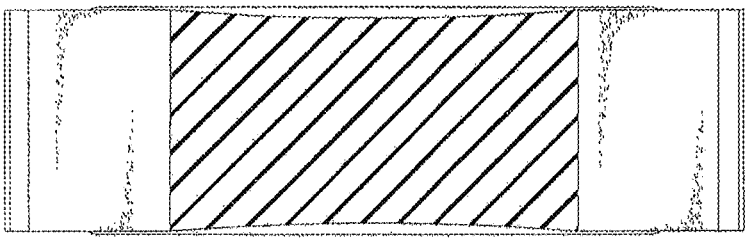
Figure 8:
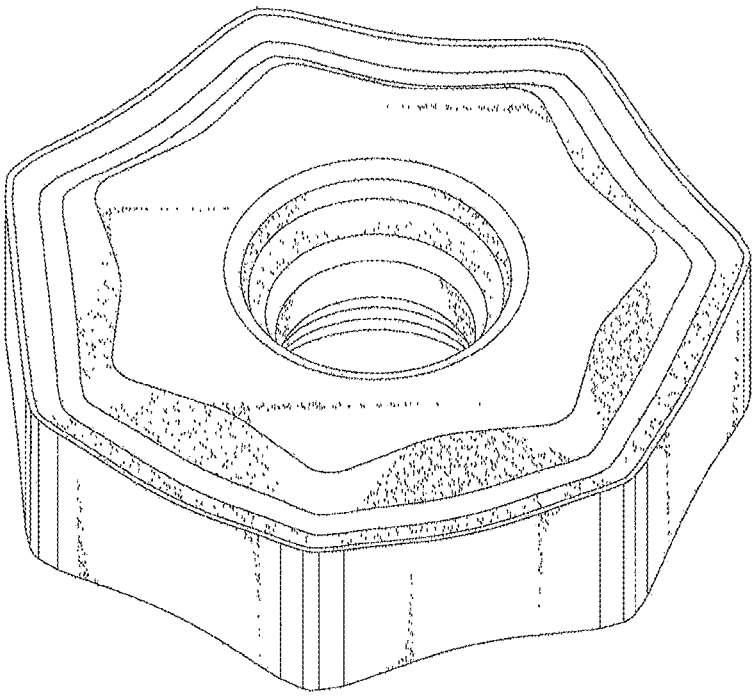
Figure 9:
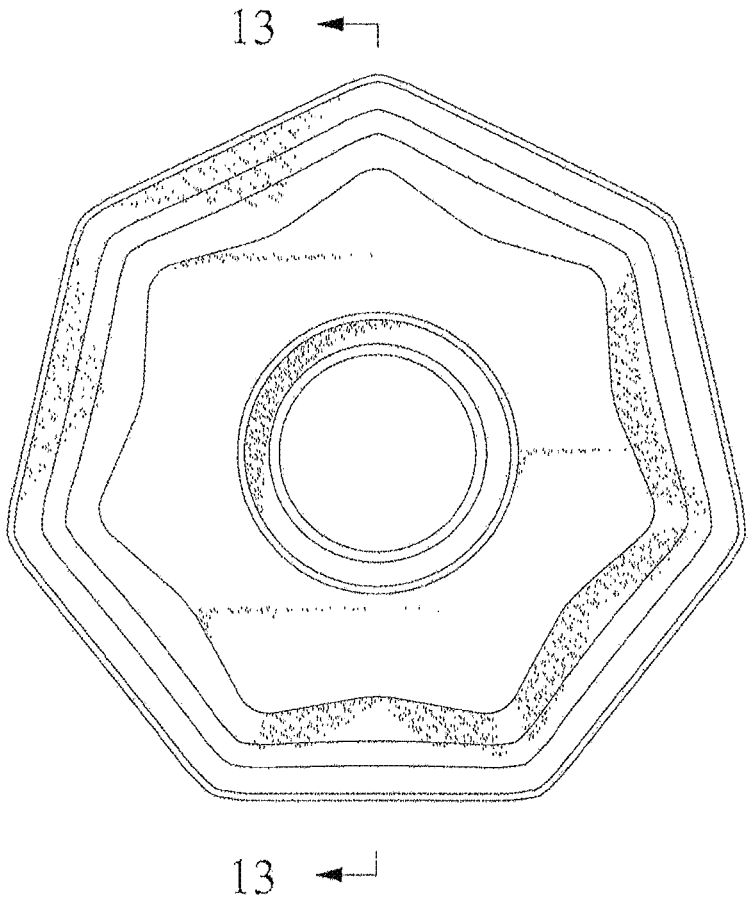
Figure 10:
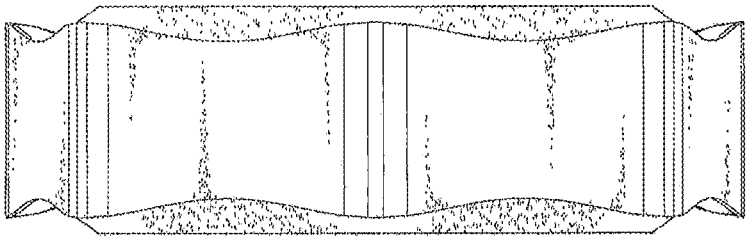
Figure 11:
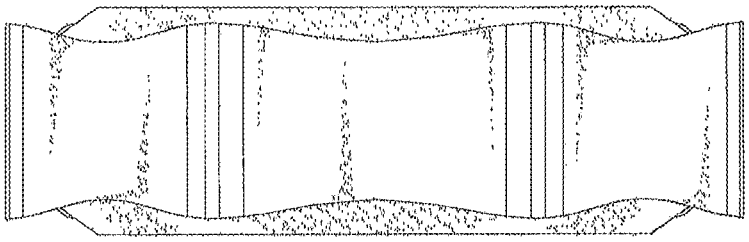
Figure 12:
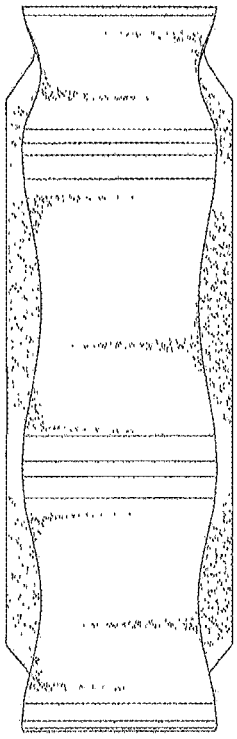
Figure 13:
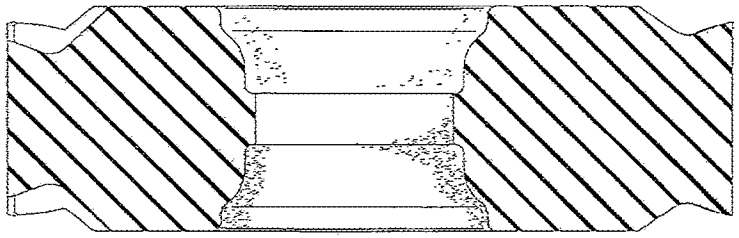
Figure 14:
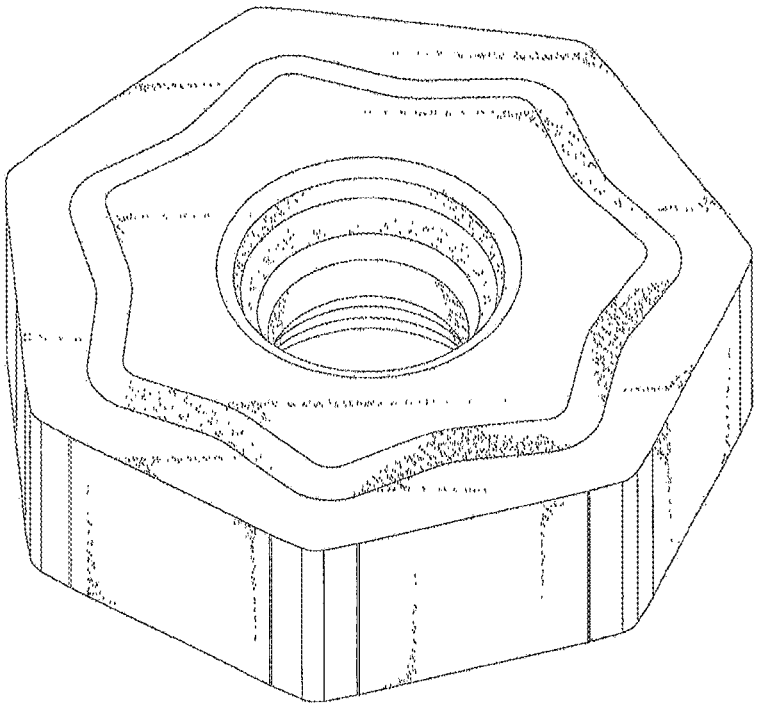
Figure 15:
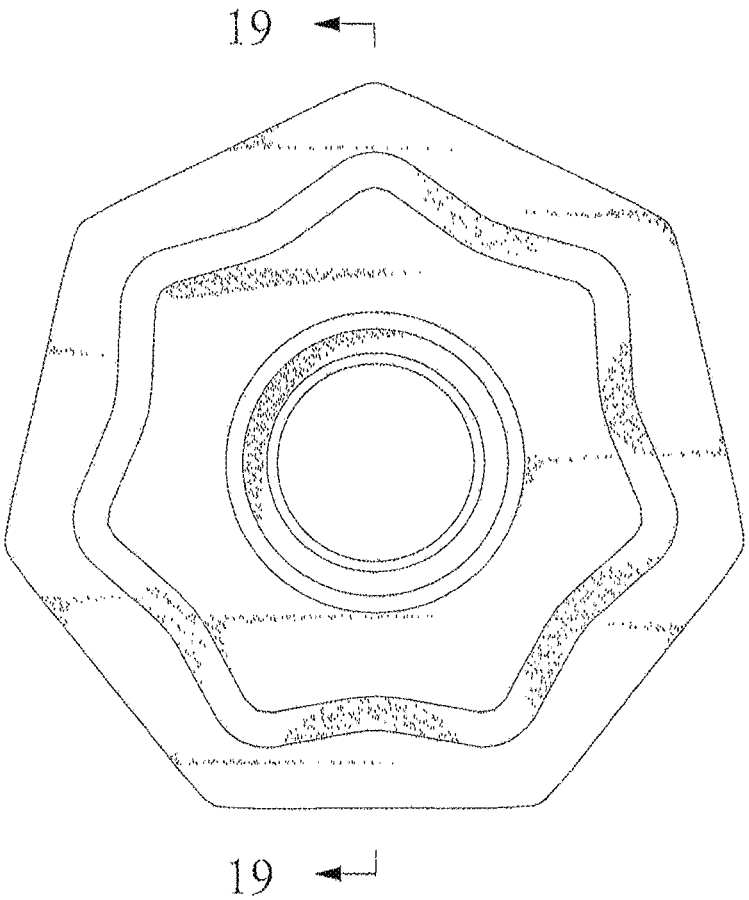
Figure 16:
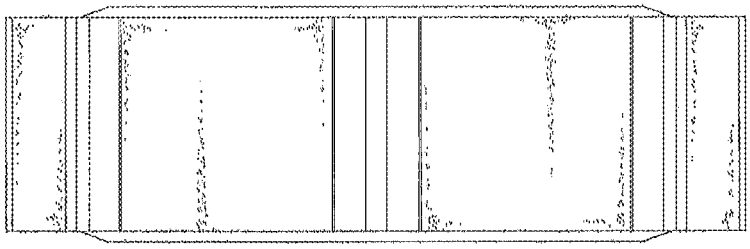
Figure 17:
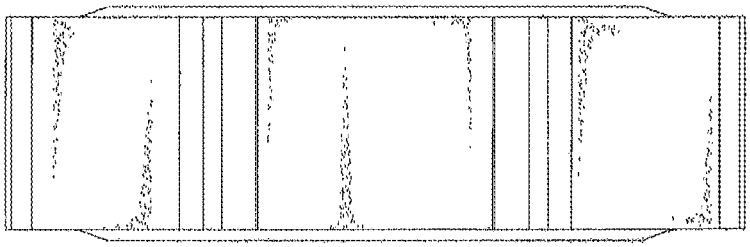
Figure 18:
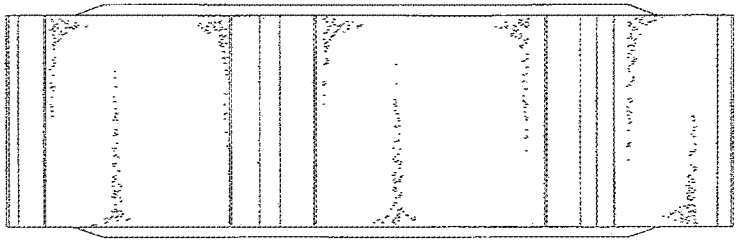
Figure 19:
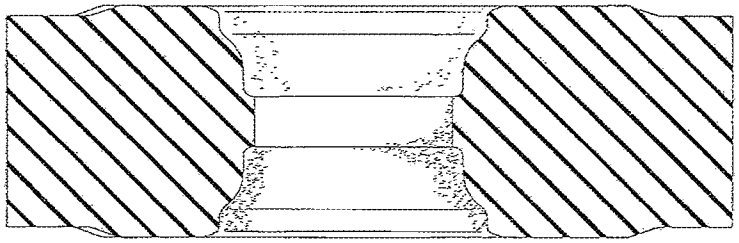

Matter enclosed in heavy brackets [ ] appears in the original patent but forms no part of this reissue; matter printed in italics indicates the additions made by reissue.

(NEW)

(56) References Cited

U.S. PATENT DOCUMENTS

| | | | | |
|---|---|---|---|---|
| 6,641,337 | B1 * | 11/2003 | Rothballer | 407/114 |
| 6,935,815 | B2 * | 8/2005 | Schwaner et al. | 407/114 |
| D559,286 | S * | 1/2008 | Waggle et al. | D15/139 |
| D573,164 | S * | 7/2008 | Nitzsche | D15/139 |
| D603,433 | S * | 11/2009 | Zastrozynski | D15/139 |
| D621,429 | S * | 8/2010 | Zastrozynski | D15/139 |
| D633,534 | S * | 3/2011 | Chen et al. | D15/139 |
| 2004/0007115 | A1 * | 1/2004 | Schwaner et al. | 83/835 |

* cited by examiner

FIG. 20
(NEW)
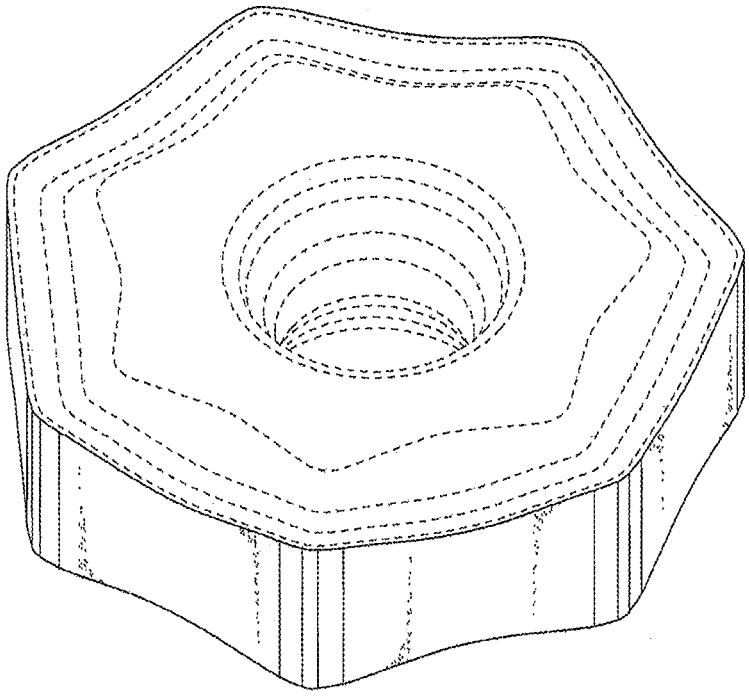

FIG. 21
(NEW)
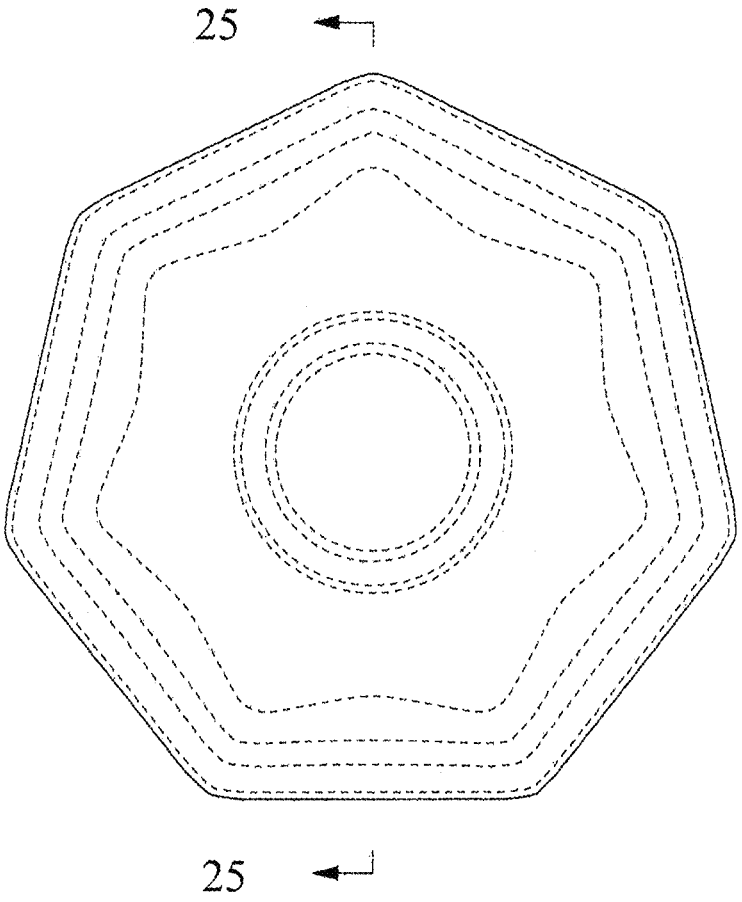

FIG. 22
(NEW)
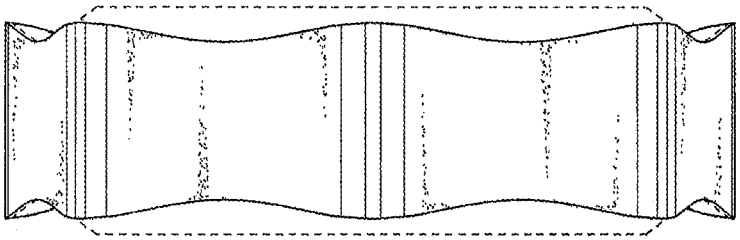

FIG. 23
(NEW)
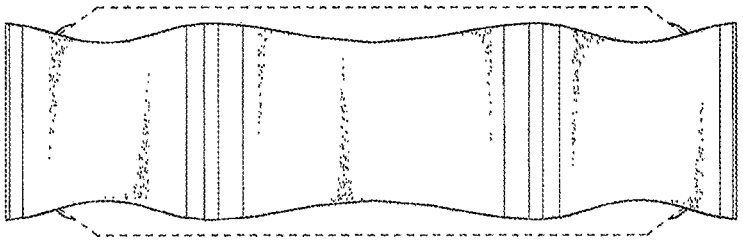

FIG. 24
(NEW)
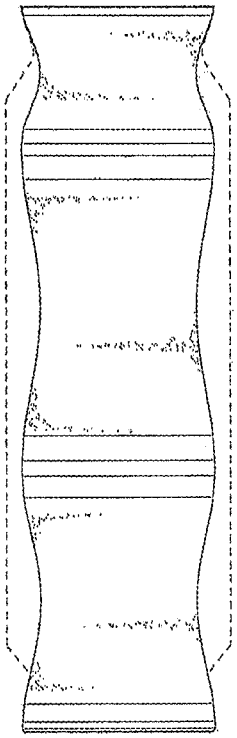

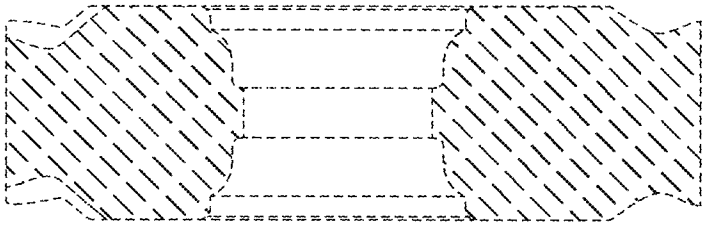

Fig. 25
NEW